United States Patent [19]

Mishra

[11] Patent Number: 4,851,123
[45] Date of Patent: Jul. 25, 1989

[54] SEPARATION PROCESS FOR TREATMENT OF OILY SLUDGE

[75] Inventor: Surendra K. Mishra, Woodlands, Tex.

[73] Assignee: Tetra Resources, Inc., Woodlands, Tex.

[21] Appl. No.: 933,119

[22] Filed: Nov. 20, 1986

[51] Int. Cl.$^4$ ............................................. C02F 11/14
[52] U.S. Cl. .................................. 210/609; 210/665; 210/705; 210/708; 210/737; 210/766; 210/774; 210/804; 210/806
[58] Field of Search ............................... 210/702-705, 210/611, 608-610, 663, 665-667, 691-694, 706-708, 729-731, 737, 749, 765, 766, 774, 776, 787-789, 799, 909, 801-807

[56] References Cited

U.S. PATENT DOCUMENTS

| | | | |
|---|---|---|---|
| 2,759,607 | 8/1956 | Boyd et al. | 210/53 |
| 2,983,677 | 5/1961 | Boyd et al. | 210/44 |
| 3,407,939 | 10/1968 | Ejefors | 210/73 |
| 3,487,003 | 12/1969 | Baillie et al. | 208/11 |
| 3,502,575 | 3/1970 | Hepp et al. | 210/42 |
| 3,707,464 | 12/1972 | Burns et al. | 210/705 |
| 3,723,309 | 3/1973 | Garcia | 210/44 |
| 3,764,008 | 10/1973 | Darley et al. | 210/73 |
| 3,864,251 | 2/1975 | Cymbalisty | 210/44 |
| 3,884,803 | 5/1975 | Traylor | 210/704 |
| 4,001,114 | 1/1977 | Joseph et al. | 210/705 X |
| 4,203,837 | 5/1980 | Hoge et al. | 210/705 |
| 4,432,887 | 2/1984 | Zajic et al. | 210/611 X |
| 4,555,345 | 11/1985 | Yoshida | 210/705 |

OTHER PUBLICATIONS

Jan Leja, "An Outline of a Mineral Flotation System, Definitions", *Surface Chemistry of Froth Flotation*, pp. 4–15, Plenum Press, 1982.
A. M. Gaudin, H. L. Miaw, H. R. Spedden, "Native Floatability and Crystal Structure", *Flotation*, pp. 202–219, Periodical, 1957.
R. R. Klimpel, "Froth Flotation: The Kinetic Approach", Paper presented at Mintek 50, Johannesburg, South Africa, Mar. 1984.
W. L. Chen, Ph.D, "Cyclones with Plain Water for Fine-Coal Cleaning", *Coal Age*, pp. 90–92, Aug. 1964.
Dorr-Oliver, Inc., "DSM ® Screens for the Food Industry", 1980.
Aplan, Frank F., "Flotation," Encyclopedia of Chemical Technology, vol. 10, pp. 523–547.

*Primary Examiner*—Tom Wyse
*Attorney, Agent, or Firm*—Arnold, White & Durkee

[57] ABSTRACT

Novel process for the removal of hydrophobic oil from solid particulates in oily sludge waste which includes waste material from the oil refineries, drilling fluids or muds, brines, and other chemical wastes which have solid particulates contaminated with oil. The process involves separation of different components of the sludge on the basis of their size, density and physicochemical differentials. Coarse particulates are removed with the use of screening systems such as sieve bends or vibro-sieves. Oil is removed from these coarse particulates with water rinsing. The separation of the sludge into high and low density fractions may be achieved by gravity separation processes or hydrocyclones. Froth flotation is used to separate hydrophobic materials from hydrophilic materials in the mixture. Froth flotation may involve the use of frothing agents, surface modifying agents and surfactants, the selection of which generally depends on the composition of the sludge, the physical and chemical characteristics of the sludge, and the desired separation composition.

23 Claims, 1 Drawing Sheet

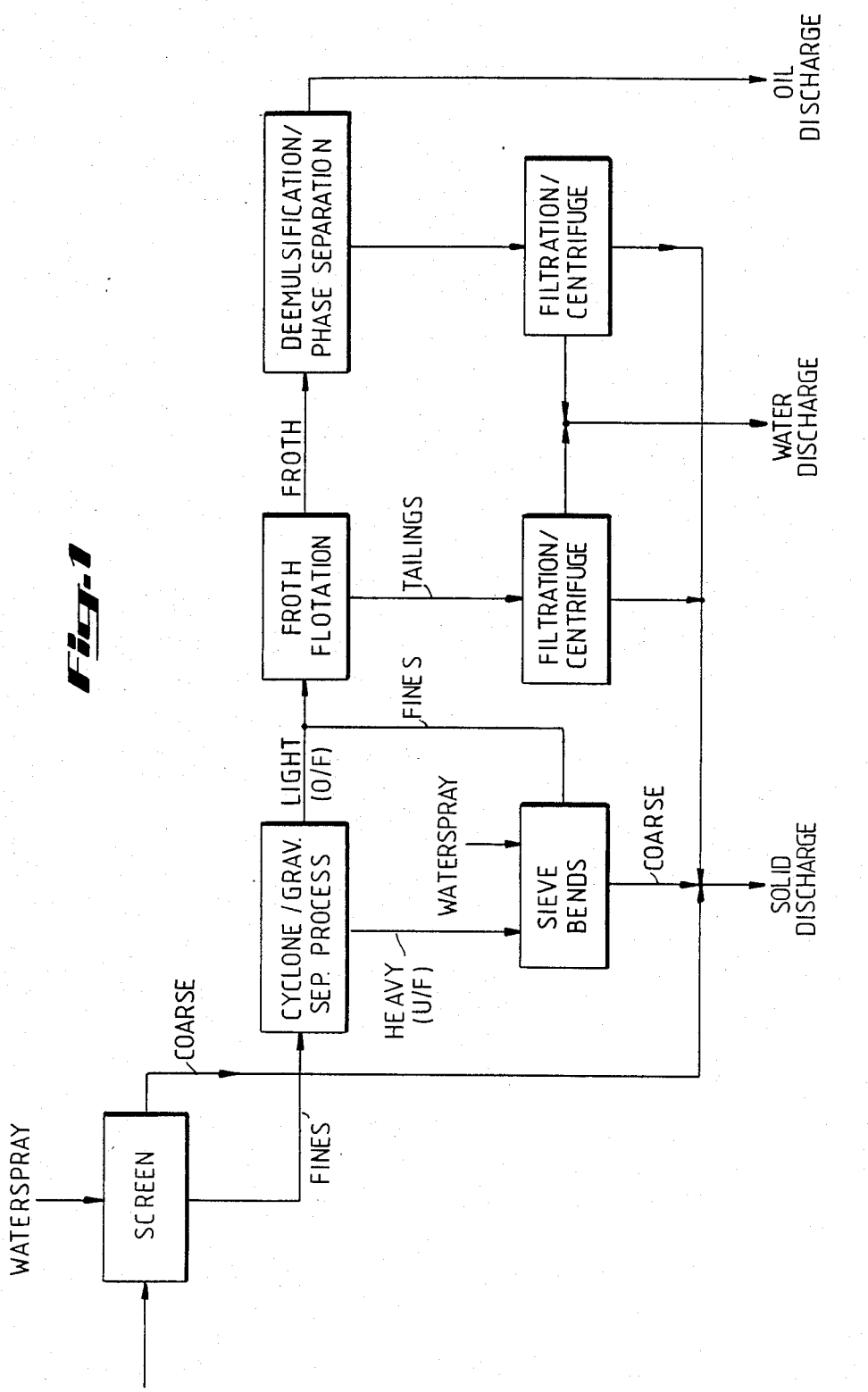

SEPARATION PROCESS FOR TREATMENT OF OILY SLUDGE

FIELD OF THE INVENTION

Separation process to remove hydrophobic oil from oily sludge containing solid particulates and water based on differences in particle sizes, densities, and hydrophobicity of components. The process also contemplates use of surfactants, surface modifying agents, and frothing agents to aid in removal of the oil and other hydrophobic components from the sludge.

BACKGROUND OF THE INVENTION

Waste materials ("oily sludge") from oil refineries, drilling operations, and other chemical and industrial operations may contain particulates of different physical and chemical compositions, hydrophobic oil fractions and water. The particulates themselves are generally hydrophilic minerals, but may include some hydrophobic particulates. "Hydrophobic oil" generally includes hydrocarbon oil and hydrophobic organic compounds with alkyl, aryl, or alkyl-aryl groups. "Oil" as used herein includes materials that are generally hydrophobic, not only petroleum or petroleum-based substances, but also oils derived from plants and vegetables.

Solid-liquid separation processes have been used to remove solids from liquid phases with varying degrees of success. Currently, industry uses expensive filtration and centrifuge operations as well as heat and chemical treatments to treat oily sludge and other waste materials. A major problem industry is facing, however, is the separation of hydrophobic oil from oily sludge. More specifically, how to liberate oil from the surfaces of the solid particles, especially where the oil has to some extent been adsorbed.

It is known that various screening systems are useful to separate solid particulates based on size differentials. Also, in some instances water rinsing can be used to remove oil from coarse particles; however, rinsing generally does not remove oil from fine particulate solids where there is significant adsorption.

Existing filtration and centrifuge processes accompanied by heat and chemical treatments can reduce the oil content of the solid particulates to a certain extent. But filtration and centrifuge operations are relatively expensive unit processes. Moreover, heat and chemical treatments have a further adverse influence on the economics of the operation. Therefore, it is an object of this invention to develop alternative processes which can either replace or complement the aforementioned processes for the treatment of oily sludge.

SUMMARY OF THE INVENTION

This invention is based on the discovery of a process for removing oil and substantially hydrophobic materials from oily sludge. The process is based on inherent differences in particle size, density and hydrophobicity of the components.

In one aspect, the invention provides a screening and rinsing step for removing substantially hydrophilic coarse particles. In another aspect, the invention provides a density separation step for separating low and high density fractions. In still another aspect, the invention provides a froth flotation step to remove substantially hydrophobic oil and particulates from the mixture. Separation of oil and particulates based on hydrophobicity can be aided by adding chemicals such as surfactants, surface modifying agents and frothing agents. The configuration of the process can be varied to achieve the most efficient and economical result.

BRIEF DESCRIPTION OF THE DRAWING

FIG. 1 shows a processing flowsheet for oily sludge treatment.

DETAILED DESCRIPTION AND PREFERRED EMBODIMENT

In a general aspect the present invention comprises a method of separating the different components of an oily sludge based on their particle size, density, and physico-chemical, i.e., interfacial properties. Specifically the process attacks the problem of separating oil from the surface of solid particulates in an aqueous mixture, i.e., an oily sludge.

The oily sludge or waste material is understood to contain water, and may be referred to as a "mixture". Enough water should be in the mixture at all times to maintain flowability. Thus, for an extremely viscous sludge, fresh or recycled water can be added to improve flowability.

When oil mixes with water and other solid particulates, the oil may be adsorbed on the surface of the particulates. Rinsing with water can occasionally remove the oil from relatively coarse particles. But rinsing has little effect on oil adsorbed on fine particulates. Therefore, more processing is needed to remove oil from the sludge. Because of the high solids content of the oily sludge, oil removal is not easily accomplished using a centrifuge. In one aspect of this invention, screening in combination with water rinsing may be used to remove coarse particles from fine particulates and surface oil. In another aspect, fine particulates can be separated into light and heavy fractions, with oil and low density particulates being classified as the light fraction and high density particulates classified as the heavy fraction. In still another aspect of the invention, froth flotation can be used, whereby relatively hydrophobic particulates and hydrophobic oil are removed as froth product and relatively hydrophilic particulates remain with the water component and are removed as tailings. The froth product contains oil and particulates that are sufficiently hydrophobic to adhere to air bubbles. The tailings contain hydrophilic particulates that do not adhere to air bubbles.

The first stage in the preferred treatment process (refer to FIG. 1) is to separate coarse particles from fine particulates ("fines") and surface oil by screening and rinsing with water. Rinsing the sludge with water during the screening process facilitates the separation of the coarse and fine particles while at the same time removing the oil from the surface of the coarse particles. This stage is especially important when the oily sludge contains a large number of coarse particles. This stage may be omitted if the particles are too fine to be screened. The exact size of the coarse particles to be removed in the screening stage is of minor importance, but is generally greater than about 0.1 mm in diameter. Hydrophilic particulates removed from the sludge at this stage should be large enough so that adsorbed oil can be rinsed off their surface with water easily. Most mineral particulates in oily sludge are hydrophilic in nature. This screening stage is generally not effective, however, for particulates substantially hydrophobic in nature, such as coal or talc. In that case, water rinsing does not remove the hydrophobic surface oil. Particles whose surface oil cannot be rinsed off with water should remain with the fines for further processing. Any conventional apparatus, such as a vibro-sieve, can be used in this first stage.

Next, the fines are separated according to their relative densities in a density separation step. The fines mixture (containing fine particulates and oil) is fed to equipment for separating high density materials (heavy fraction) from low density materials (light fraction), e.g. a gravity separation system or a hydrocyclone. In this stage, gravity separation is recommended if the particles are relatively coarse, and if the density difference is great so that the particles are easy to separate. This could be the case if the sludge contained coal or talc, and if the screening stage were omitted.

By controlling the density separation operation, the composition of the light fraction component (low density) and the heavy fraction component (high density) can be varied. In general, it is desired that the light fraction include mainly hydrophobic oil and hydrophobic particulates, while the heavy fraction be comprised of predominantly hydrophilic particulates with some hydrophobic oil component and oil-coated fine particulates. An advantageous feature of this invention is that some hydrophobic oil can be separated from hydrophilic particulates based on density differentials, i.e., before froth flotation. This may provide a significant savings in chemical additives, which would otherwise be required to separate the hydrophobic oil.

Fines in the heavy fraction may contain some hydrophobic component. In one aspect of the invention, the hydrophobic component is recovered using a screening system such as a sieve bend, vibro-sieve, or some similar screen system. A Dorr-Oliver DSM Screen is one device that can be used at this stage. Water sprays are used to rinse off remaining fines and surface oil in the heavy fraction from coarse particle surfaces. These fines are then combined with the light fraction of the density separation step, e.g., hydrocyclone or gravity separation system. The resultant light fraction stream is then conditioned with surfactants for the next stage.

The next stage is to separate the hydrophobic from hydrophilic components of the light fraction, based on the physico-chemical, i.e., interfacial property differentials of the particulates. The preferred process is froth flotation whereby the light fraction is fed to a flotation cell. K. L. Sutherland and I. W. Wark, *Principles of Flotation*, Australasian Inst. of Mining and Metallurgy (Melbourne 1955) 4–15, is incorporated by reference. In froth flotation, air bubbles are created through agitation or by the introduction of forced or induced air. These air bubbles adhere to the hydrophobic particulates and oil droplets and, due to buoyancy, float to the surface where they are skimmed off as froth product. The hydrophilic component of the mixture remains in the flotation cell as tailings and is continuously discharged for further processing.

"Hydrophobic" and "hydrophilic" as used herein are relative terms. The objective is to remove hydrophobic oil as froth product. Accordingly, "hydrophobic" oil is oil that adheres to the air bubbles and becomes part of the froth. Mineral particulates such as calcite may also be removed as a desired hydrophobic froth product after appropriate surfactant treatment. The operator must decide the line that is to be drawn between "hydrophobic" and "hydrophilic". Accordingly, the operator can control the composition of the froth product by adding surfactants, surface modifying agents, and frothing agents.

The froth product contains hydrophobic fractions and some carry-over water. This hydrophobic fraction includes oily materials and hydrophobic particulates, the dominating phase being the oily materials. For further separation of oil from the solid and water phases, the froth product may require heat and further surfactant treatments. The tailings contain little to negligible oily fraction. However, the tailings can be treated by further froth flotation as a scavenger process using the similar reagent scheme of surface modifying agents, surfactants, and frothing agents.

The final tailings, substantially void of oily component, are flocculated using chemical additives. These additives can be either organic or inorganic. Organic polymer additives can be anionic, cationic, or nonionic, individually or in combinations. Their selection depends on the nature of the surface charge of the particulates and the electrolytic environment. For example, if particulates are negatively charged, cationic polymer additives are appropriate. The flocculated tailings may then be dewatered using filtration or centrifuge systems.

The filter cakes produced from the filtration or centrifuge systems are combined with the coarse solid fractions from the screening and sieve bend systems in the circuit and discharged as solid waste. The filtrate from the filtration or centrifuge systems, void of oil content, is discharged as water fraction.

The surface modifying agents used in the froth flotation step generally include electrolytes (inorganic or organic) that adsorb at the solid-liquid or liquid-air interfaces. These surface modifying agents change the interfacial chemistry of the system. Selected surface modifying agents can promote the adsorption of other surfactants at the aforementioned interfaces. Surface modifying agents from other selected groups can prevent their adsorption. A wide range of inorganic and organic electrolytes are part of this general group of surface modifying agents. Examples are alkali metal carbonates, hydroxides, phosphates, silicates (of sodium, potassium or lithium groups), carboxylates, sulfates, sulfonates, phosphates, phosphonates, amines of various alkyl, aryl, or alkyl-aryl groups and their esters. Acids and alkalis are also part of this general group of surface modifying agents.

Whether or not the surface modifying agent is to be added depends on the physico-chemical and chemical characteristics of the solid particulates. These characteristics are discussed in depth in D. W. Fuerstenau and T. W. Healy, "Principles of Mineral Flotation", Adsorptive Bubble Separation Techniques 92–131 (New York 1972) Academic Press, which is hereby incorporated by reference. In some cases, no surface modifying agent is needed; for example, if the sludge consists of pure sand, water and relatively little hydrophobic oil. On the other hand, appropriately selected surface modifying agents are needed when relatively fine particulates are present. The appropriate surface modifying agent is normally chosen on a case-by-case basis, depending on the interfacial properties of the solid and the chemical properties of the sludge.

In addition to chemical surface modifying agents, heat and aerobic heterotrophic micro-organisms may also be used to optimize the process. Heat may be supplied in the form of steam. Examples of micro-organisms that can serve as surface modifying agents are Flavobacterium species, Pseudomonas species, Coryne bacterium species, and Nocardia species. These help in the desorption of the oily component from the solid surface.

The surfactants which are used for the froth flotation step enhance hydrophobicity, and thereby the flotability of particulates or oil droplets. They can be anionic, cationic, nonionic, or amphoteric in nature. The choice of these surfactants depends upon the type of separation desired and the composition of the oily sludge to be treated. The following publications contain potentially helpful information in choosing a surfactant, and are hereby incorporated by reference: M. C. Fuerstenau and B. R. Palmer, "Anionic Flotation of Oxides and Silicates, Flotation A. M. Gaudin Memorial Volume ed. by M. C. Fuerstenau, Vol. 1 AIME publ. (1976) 148; R. Klimpel, "The Engineering Characterization of Flotation Reagent Behavior", Proceedings of Mill Operators Conference, Australasian Inst. of Mining & Metallurgy (1982) 297. Available surfactants are also discussed by R. R. Klimpel, "Froth Flotation: The Kinetic Approach" presented at Mintek 50 Johannesburg, South Africa, March, 1984.

Surfactants used in the froth flotation can be divided into two groups. The first group includes amines, carboxylates, sulfates, sulfonates, phosphates, phosphonates, and thiolates of alkyl, aryl, or alkyl-aryl groups or their esters. The second group comprises alcohols, alkoxy compounds, glycols, and glycol ethers. The major function of surfactants from the first group is to render the particulate or oil droplet surfaces hydrophobic. The second group of surfactants acts as an air bubble stabilizer which in turn stabilizes the froth produced in the process. The second group is also known as "frothing agents".

EXAMPLE

Oily sludge from a petroleum refinery waste disposal pit contained about 13 wt.% solid, about 8 wt.% oil and grease and the remainder water. This mixture was mixed for 5 minutes by shaking with hands in a glass cylinder and was allowed to settle for 15 minutes. The coarse and heavy fraction sediment was observed to form at the bottom of the cylinder. The supernatant which included a significant portion of oily sludge and fine particulates was carefully decanted. The sediment was slurried with an equal volume of water, allowed to settle for 5 minutes; the supernatant was then decanted and mixed with the first decanted supernatant. The remaining sediment was kept aside for analysis.

Approximately 0.1 g/liter equivalent Dowfroth 420M was added to the supernatant fraction and was mixed. This mixture was then transferred to a laboratory scale 200 ml capacity flotation cell in which air bubbles were created using compressed air. Due to aeration a froth was created at the surface of the slurry. The froth was carefully removed periodically till there was no visible particle or oil loaded froth seen on the surface. The remaining slurry ("tailings") was transferred into a container and flocculated. The flocculated slurry was then analyzed for oil and grease content, the recovered froth fraction and the sediment obtained from the sedimentation-decantation process. The analytical results are given in Table 1.

TABLE 1

|  | Wt % | | Oil & Grease | |
| --- | --- | --- | --- | --- |
|  | Solid | Water | Fraction | % of Total |
| Decanted Sediment | 53.0 | 41.8 | 5.2 | 16.0 |
| Supernatant Fraction: | | | | |
| Froth | 17.0 | 40.8 | 42.2 | 84.0 |
| Tailings | 1.3 | 98.7 | Trace | Trace |

Oil & Grease Reduction in Substrate = 84 wt. %

What is claimed is:

1. A process for separating substantially hydrophobic material from a sludge, which comprises hydrophobic oil, solid particles, and water, comprising the steps of:
    separating the mixture on the basis of density into a light fraction comprising hydrophobic oil and particles and a heavy fraction comprising water; and
    separating by froth flotation the light fraction, which comprises a relatively hydrophobic component and a relatively hydrophilic component, into a froth which includes the hydrophobic component and tailings which include the hydrophilic component.

2. The process of claim 1 in which the solid particles are minerals.

3. The process of claim 1 in which separating the mixture on the basis of density is accomplished by gravity separation.

4. The process of claim 1, additionally comprising removing substantially coarse solid particles from said sludge prior to the density separation step and the froth flotation step.

5. The process of claim 4 wherein said coarse particles are greater than about 0.1 mm in diameter.

6. The process of claim 1 additionally comprising adding heat to said mixture.

7. The process of claim 1 additionally comprising adding oil decomposing micro-organisms to said mixture.

8. The process of claim 7 in which micro-organisms are added before the froth flotation step.

9. The process of claim 1 additionally comprising adding a surfactant or surface modifying agent or frothing agent to said mixture in an amount sufficient to promote separation of the substantially hydrophobic component and the substantially hydrophilic component.

10. The process of claim 9 in which the surfactant is a carboxylate, sulfate, sulfonate, amine, phosphate, phosphonate, or thiolate of alkyl, aryl, or alkyl-aryl groups or their esters.

11. The process of claim 9 in which the frothing agent is an alcohol, alkoxy compound, glycol or glycol ether.

12. The method of claim 1 wherein the froth flotation step includes adding to the mixture a treating agent capable of reducing interfacial tension between the water and air interface.

13. The method of claim 1 in which the hydrophobic oil comprises a mixture of various hydrocarbons.

14. A process as recited in claim 1 wherein separating the mixture on the basis of density is accomplished by hydrocycloning.

15. A method of treating a sludge containing solid mineral particles, hydrophobic oil and water, which comprises the steps of:
    size separating relatively coarse size particles from the sludge and leaving the sludge with relatively fine particles;

gravity separating the resulting separated sludge to form a relatively heavy fraction sediment and a relatively light supernatant fraction containing oily solid particles;

applying froth flotation to the relatively light supernatant fraction to concentrate hydrophobic oil from the oily solid particles into a froth; and separating the resulting froth containing concentrated hydrophobic oil from the supernatant fraction.

16. The method of claim 15 which further comprises the step of treating the relatively light supernatant fraction with a treating agent adsorbable by the solid particulates, sufficiently less hydrophobic than the hydrophobic oil, to displace the hydrophobic oil from the solid particulates.

17. The method of claim 16 which further comprises adding a frothing agent to the relatively light supernatant fraction at the froth flotation step, said frothing agent being capable of reducing the interfacial tension between the air and water interface.

18. The method of claim 15 in which the sludge is an oil refinery sludge.

19. The method of claim 15 in which the hydrophobic oil comprises petroleum hydrocarbons.

20. The method of claim 15 which further comprises the step of deemulsifying the separated froth to recover hydrophobic oil from the froth.

21. The method of claim 15 in which the sludge contains phenols.

22. The method of claim 21 in which the phenol is creosote.

23. A method of treating an industrial sludge containing hydrophobic oil, particles and water, comprising:

separating relatively coarse particles from the sludge;

separating the remaining sludge into a relatively heavy fraction comprising water, and a relatively light fraction comprising hydrophobic oil and particles; and froth floating the relatively light fraction to separate hydrophobic oil from the relatively light fraction.

* * * * *